Feb. 3, 1931. C. F. M. VAN BERKEL ET AL 1,790,888
SLICING MACHINE
Filed Oct. 22, 1927 4 Sheets-Sheet 1
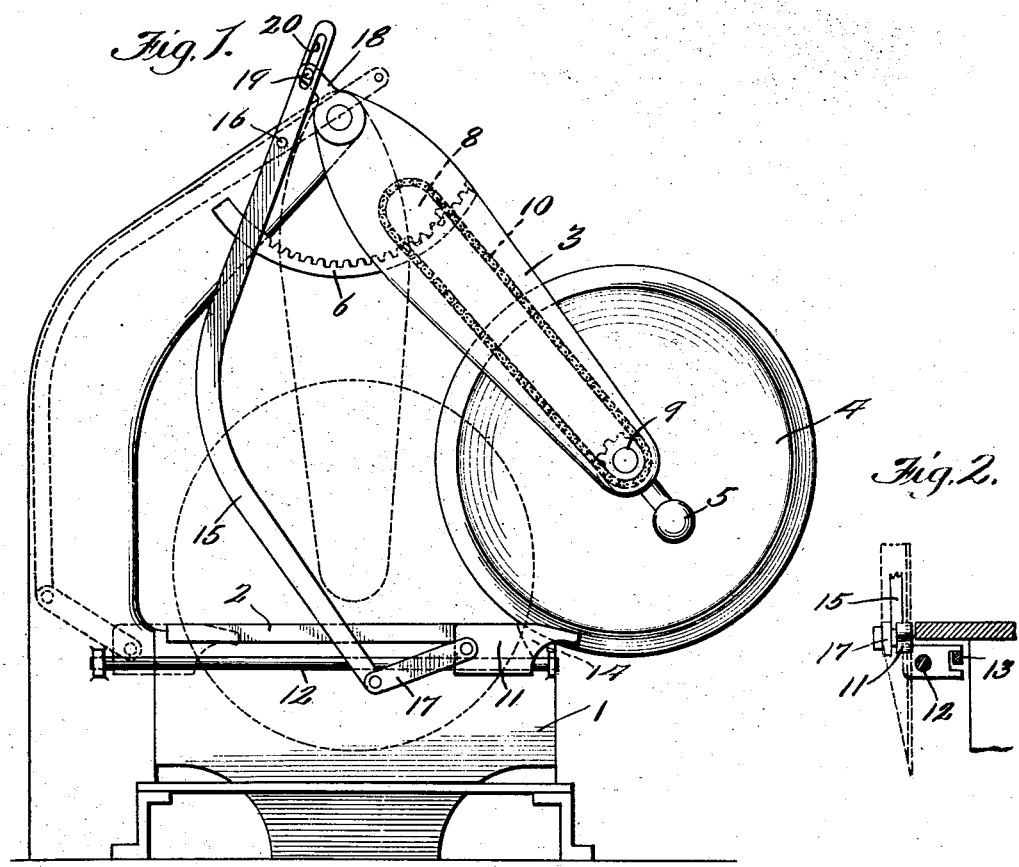
Inventors
Cornelis F. M. van Berkel
Jetye van Hoorn
By Nissen & Crane Attys.

Feb. 3, 1931.  C. F. M. VAN BERKEL ET AL  1,790,888
SLICING MACHINE
Filed Oct. 22, 1927  4 Sheets-Sheet 3

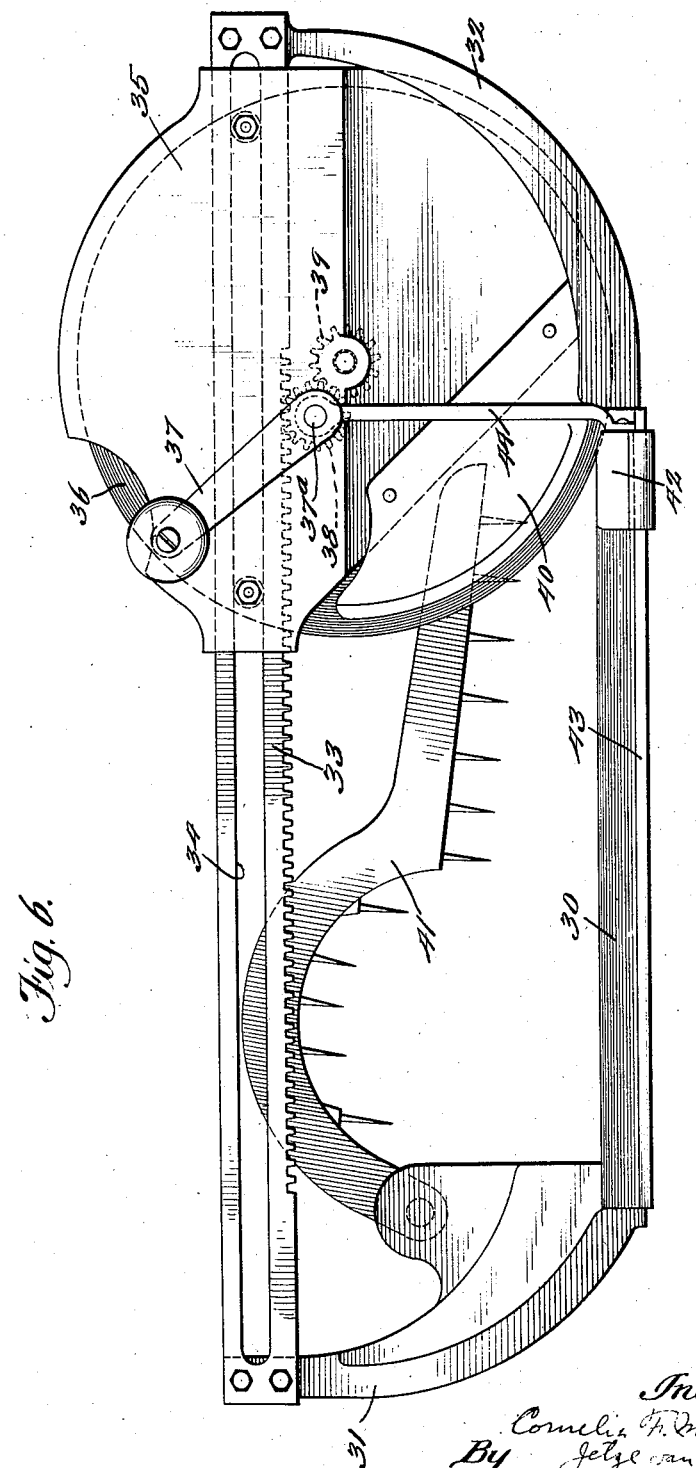

Patented Feb. 3, 1931

1,790,888

UNITED STATES PATENT OFFICE

CORNELIS FRANCISCUS MARIA VAN BERKEL, OF WASSENAAR, AND JETZE VAN HOORN, OF VOORBURG, NETHERLANDS, ASSIGNORS TO U. S. SLICING MACHINE COMPANY, OF LA PORTE, INDIANA, A CORPORATION OF INDIANA

SLICING MACHINE

Application filed October 22, 1927, Serial No. 228,075, and in Great Britain December 9, 1926.

This invention relates to machines for slicing meat and other material and has for its object the provision of machines of the class named which shall be of improved construction and operation.

A further object is to provide a support, commonly referred to as a skin support, for the projecting portion of the material to be sliced, which is particularly applicable to slicing machines in which the rotary circular knife is movable relative to the machine frame. Other objects and advantages will appear from the following description.

The invention is exemplified in the combination and arrangement of parts shown in the accompanying drawings, and described in the following specification, and it is more particularly pointed out in the appended claims.

In the drawings:

Fig. 1 is an elevation of a slicing machine of the conventional swinging arm type having one embodiment of the present invention applied thereto;

Fig. 2 is a fragmentary vertical section showing the skin support and parts associated therewith;

Fig. 6 is an elevation of a slicing machine of a type in which the slicing knife is adapted to be reciprocated past the substance to be sliced.

Figure 3:
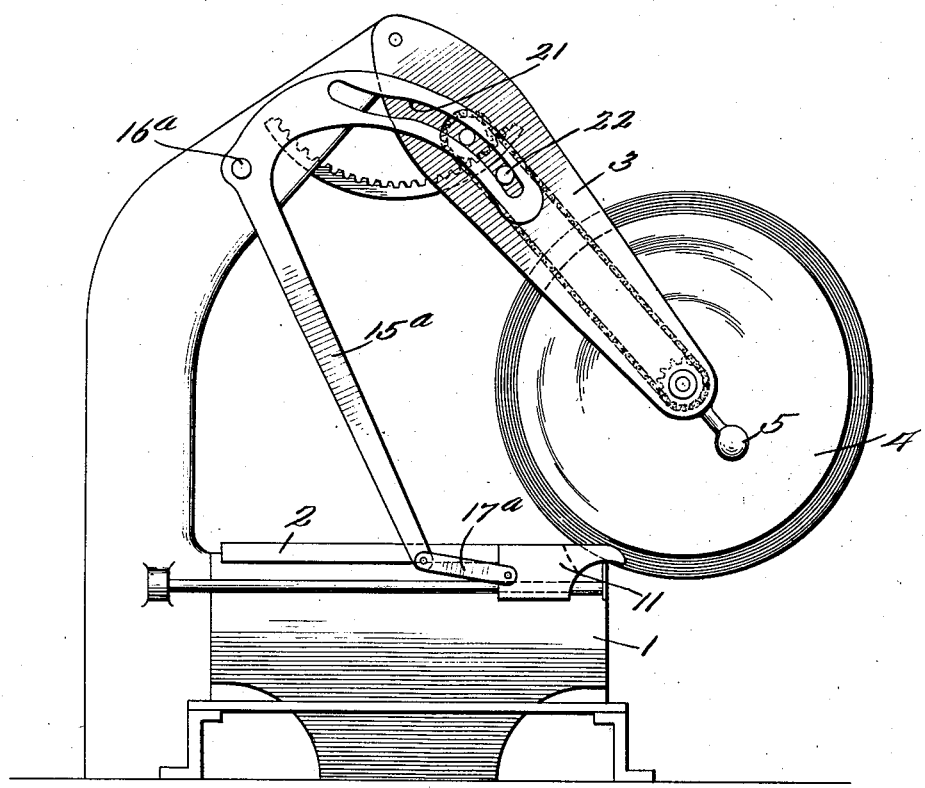
Fig. 3 is a view similar to Fig. 1 showing a modified form of the invention.

Difficulties are encountered in the application of a skin support to several types of slicing machines in which the knife is moved bodily to and fro past the substance to be sliced in an arcuate path. The present invention relates to slicing machines of these types and overcomes the difficulties heretofore experienced in providing skin supports for this class of machines.

The invention comprises a skin support which is adapted to move during the working of the slicing machine in such manner as to preserve the requisite relationship with the cutting edge of the knife and at the same time to maintain its upper surface substantially flush with the substance supporting surface of the machine. When embodied in a slicing machine of the swinging arm type, the skin support is arranged to move with the swinging arm backward and forward substantially in the plane of the substance-supporting surface of the machine. The skin support may be operatively connected to the swinging arm and may be slidable along a guide or guides on the base of the machine. When embodied in a slicing machine of the swinging arm type in which the substance supporting surface is arcuate, the skin support is rigidly attached to the swinging arm. When embodied in a slicing machine of the type in which a rotary knife is reciprocable relative to the substance to be sliced, the skin support may be operatively connected to a part adapted to be reciprocated in unison with the knife. When embodied in a slicing machine of the type in which the substance is supported on a carriage adapted to be oscillated past a slicing knife rotatable about a stationary axis, the skin support may be pivotally and slidably mounted on a stationary part of the machine and be slidably mounted on said carriage.

The slicing machine shown in Fig. 1 is of a well-known type and comprises a stationary frame 1, a feed table 2, on which the substance to be sliced is supported, and a swinging arm 3 pivoted at one end on the frame 1 and carrying at its other end a circular knife 4. The arm 3 can be swung to and fro from the position in which it is shown in full lines to that shown in broken lines in which it depends vertically, a handle 5 being provided to swing the arm upon its pivotal support. When the arm is swung in this manner, the knife 4 is caused to rotate about its axis by the action of a stationary rack 6 which meshes with a pinion wheel secured to the same shaft as a sprocket wheel 8 which drives a sprocket wheel 9 by means of a chain 10, the sprocket wheel 9 being secured to the knife shaft. Mechanism not shown is provided for feeding the supporting table 2 intermittently toward the cutting plane of the knife. A skin support 11 is slidably mounted on two guide rails 12 and 13 fitted to the base of the frame 1. As shown in Fig. 2, the rail 12 is circular in cross section and penetrates the support 11, whereas the rail 13 is rectangular and engages a forked part of the support. The uppermost face of the skin support 11 is substantially flush with the substance supporting surface of the feed table 2 and the end of the support adjacent the slicing knife may be beveled or notched, as indicated at 14 and as shown more clearly in Fig. 9, to conform to the beveled portion of the slicing knife.

The skin support 11 is operatively connected to the swinging arm 3 by means of mechanism comprising a lever 15 pivoted at 16 on the frame 1. A link 17 connects one end of the lever 15 to the skin support 11. An extension 18 on the arm 3 is provided with a pin and slot connection 19 and 20 with the end of the lever 15. The parts are proportioned and the slot 20 so arranged that in the operation of the machine, the skin support maintains a substantially uniform closeness to the cutting edge of the knife throughout the entire range of the swing of the arm 3.

In the embodiment of the invention shown in Fig. 3, the slicing machine is of the same type as that shown in Figs. 1 and 2 and is provided with a similar skin support 11. The operative connection between the skin support and the arm 3, however, comprises a lever 15$^a$ pivotally mounted at 16$^a$ on the frame 1. One arm of the lever 15$^a$ is connected to the support 11 by a link 17$^a$. The other arm of the lever 15$^a$ is formed with a cam slot 21 engaged by a pin 22 on the arm 3. The shape of the cam slot 21 is such that in the operation of the machine, the skin support is always close to the cutting edge of the knife 4.

Figure 4:
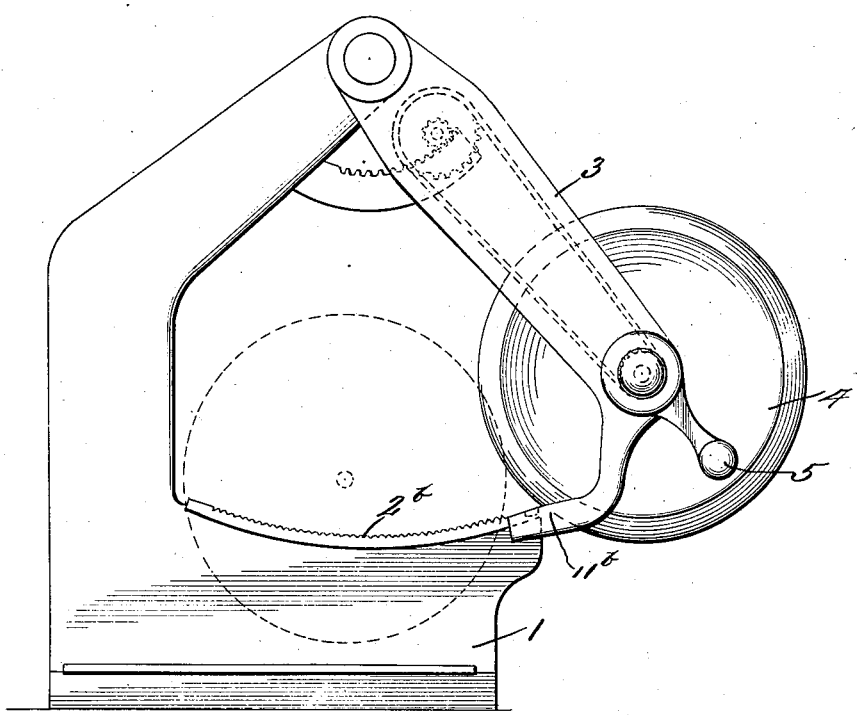
Fig. 4 is an elevation and Fig. 5 a section of a slicing machine of the swinging arm type in which the material-supporting surface is arcuate.
Figure 5:
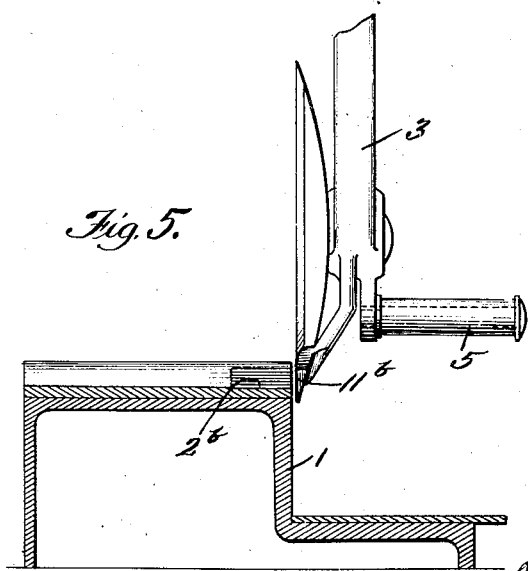

The slicing machine shown in Figs. 4 and 5 has an arcuate feed table 2$^b$ but in other respects is substantially similar to the slicing machine shown in Figs. 1, 2 and 3. The skin support 11$^b$ is rigid with the swinging arm 3 so that the relationship which the support bears to the cutting edge of the knife 4 is constant. Since the work support 2$^b$ is curved about the pivotal center of the arm 3, it is apparent that the skin support 11$^b$ will remain flush with the surface of the work support for all positions of the slicing knife 4.

The slicing machine shown in Fig. 6 is of the type in the operation of which a rotatable circular knife is reciprocated past the substance being sliced. As shown, the machine comprises a base 30 from the ends of which two brackets 31 and 32 extend upwardly. The brackets 31 and 32 support a rack bar 33 having a guide slot 34 therein. A casing 35 encloses the knife 36 and is slidably mounted on the guide slot 34. A crank handle 37 is journaled in the casing 35 and is provided with a pinion 38 meshing with the rack teeth of the bar 33 and also with a gear wheel 39 on the knife shaft. The pinion 38 has a one-way driving connection with the shaft 37$^a$ attached to the crank 37. The numeral 40 denotes a slice deflector. In the operation of the machine, the substance is clamped to the base 30 by a clamping bar 41. A handle 37 is then turned clockwise and the casing 37 thereby caused to travel along the guide 34. At the same time, the knife is caused to rotate. When the casing has reached the end of its travel, it is returned to its starting position simply by pulling the handle toward the right without rotation, this being permitted because of the one-way drive connection between the shaft 37$^a$ and the pinion 38. The substance to be sliced is advanced step by step by feeding mechanism, not shown. A skin support 42 is slidably mounted on the guide bar 43 secured to the base 30. The support 42 is fixed to the housing 35 to move in unison therewith by means of a bracket 44 which is secured to the support 42 and the housing 35. The relationship of the skin support to the cutting edge of the knife remains unaltered throughout the travel of the casing.

Figure 7:
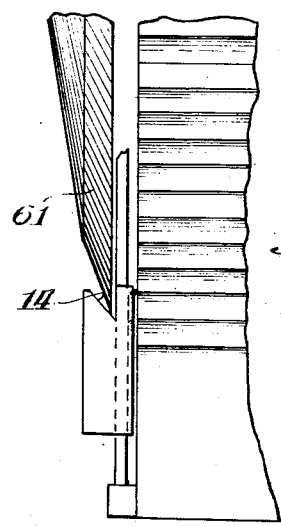
Fig. 7 is a detail plan view of one form of skin support.

The slicing machine shown in Figs. 7 and 8 is of the type described in application, Serial No. 82,405 of C. F. M. van Berkel, filed January 20, 1926, and comprises a base 45 having an arcuate track 46 upon which the work support 47 oscillates past the edge of the knife 48. The work support 47 is provided with a universal pivotal connection 49 with an arm 50 mounted on the frame 45. A T-slot 51 is cut in the carriage or under-table 47 and forms a track for two rollers 52 mounted on the skin support 53, the latter having an extension 54. A slot 55 formed in the extension 54 is engaged by a pin 56 carried by a stationary bracket 57 outstanding from the knife bracket 58 of the frame 45. The upper surface of the skin support 53 is substantially flush with the material supporting surface of the feed table 59 and is maintained in this relationship and close to the cutting edge of the knife 48 throughout the entire range of oscillation by virtue of the pivotal and slidable mounting of the skin support.

The several embodiments described have been chosen simply by way of example and many modifications may be adopted without departing from the scope of the invention. The skin support may be of any usual and well-known type. For example, as shown in Fig. 9, it may be a notched plate 60 extending on both sides of the slicing knife 61. If desired, the skin support could be so arranged as to be adjustable towards or away from the cutting edge either in the plane of the knife or in a direction perpendicular thereto. The means for guiding the skin support may be varied, if desired.

In the embodiment of the invention as applied to slicing machines of the swinging arm type in which the skin support is guided on the base of the machine so as to slide in advance of the knife, the operative connection between the swinging arm and the skin support may take any of a number of forms.

We claim:—

1. In a slicing machine, a frame member, a work support on said frame member, means for severing slices from material on said work support, means for supporting slices while they are being severed, and means for moving said slice supporting means to maintain a substantially constant relationship of said slice supporting means with the position at which the severing operation is taking place.

2. In a slicing machine, a supporting frame, a work support and a slicing knife mounted on said frame and movable relative to each other for severing slices in a manner to shift the cutting position relative to said frame during a slicing operation, a slice support arranged to support the slice during the severing operation thereof, and means to shift said slice support to maintain the position of said support relative to the position of the slicing operation of said knife.

3. In a slicing machine, a supporting frame, a knife movable relative to said frame for severing slices from material on said frame, a support for slices while they are being severed, and means for moving said slice support to maintain a substantially constant relation thereof with said slicing knife.

4. In a slicing machine, a work support, a slicing knife movable relative to said work support, a slice support for sustaining the slices while they are being severed by said knife, means for moving said slicing knife relative to said work support, and means for moving said slice support simultaneously with said slicing knife to retain said slice support adjacent the cutting portion of the edge of said slicing knife and substantially flush with the supporting surface of said work support.

5. In a slicing machine, a supporting frame, means for severing slices from material on said frame, a support for the portion of the material being severed, and means for moving said support relative to said frame, said last mentioned means being adapted to support the substance in proximity to said first mentioned means during the slicing operation.

6. In a slicing machine, a supporting frame, a work support mounted on said frame, a slicing knife movable on said frame relative to said work support, a slice support for sustaining the portion of the material on said work support which is being severed to form a slice, and means for moving said slice support on said frame in unison with the movement of said slicing knife to maintain said slice support in substantially fixed relation with the cutting portion of said knife.

7. In a slicing machine, a work support, a slicing knife, a slice support, and means for moving said slice support during a slicing operation to preserve the requisite relation with the cutting edge of said knife and at the same time to maintain the upper surface of said slice support substantially flush with the supporting surface of said work support.

8. In a slicing machine, a supporting frame, a swinging arm pivotally mounted on said frame, a slicing knife carried by said arm, and a slice support for sustaining the portion of the material being sliced, said slice support being mounted to move with said swinging arm, and means for retaining said slice support with its supporting surface substantially flush with the supporting surface for the material being sliced.

9. In a slicing machine, a supporting frame, a swinging arm pivotally mounted on said frame, a slicing knife carried by said arm, a work support on said frame having a substantially horizontal supporting surface, a slice support for sustaining the portion of material on said work support which is being severed by said slicing knife, means for moving said slice support in unison with said slicing knife, and a guide for directing said slice support to maintain the supporting surface thereof substantially flush with the supporting surface of said work support.

10. In a slicing machine, a supporting frame, a swinging arm pivotally mounted on said frame, a slicing knife carried by said swinging arm, a work support having a substantially horizontal surface mounted on said frame, a guide disposed adjacent one edge of said surface, a slice support movable on said guide, and means operatively connected with said swinging arm to move said slice support along said guide when said arm is operated to cause the knife thereon to sever a slice.

11. In a slicing machine, a work support, a slicing knife movable along one edge of said work support, a guide disposed adjacent said edge, a slice support mounted on said guide, and means for moving said slice support along said guide in unison with the movement of said knife to maintain a substantially constant relation between the slice support and the cutting edge of said knife.

12. In a slicing machine, a work support having a substantially flat supporting surface, a rotary circular slicing knife mounted to move in an arc along one edge of said work support, a slice support, means for moving said slice support simultaneously with the movement of said knife, and a guide for directing said slice support along a cord of the arc of movement of said knife.

13. In a slicing machine, a supporting frame, a slicing knife, means for moving said knife to and fro adjacent said frame, a slice support, and means for moving said support in advance of said knife during the cutting stroke thereof to support the slices while they are being severed.

14. In a slicing machine, a supporting frame, a slicing knife, means for moving said knife to and fro adjacent said frame, a slice support, and means for moving said support substantially parallel with the edge of said frame and in advance of said knife during the cutting stroke thereof to support slices while they are being severed.

15. In a slicing machine, the combination with a material supporting surface, of a knife moving relative to said material support for slicing the material on said support, and a second supporting surface for the material being sliced arranged directly in the path of movement of said knife and adjacent said first supporting surface.

16. In a slicing machine, the combination with a main support for the material being sliced, of a slicing knife movable relative thereto, and an auxiliary support for the material being sliced adapted to support slices while they are being severed from the material, said auxiliary support moving in a plane parallel with the main support.

17. In a slicing machine, the combination with a slicing knife, of a main work support for the material to be sliced, means for moving the knife relative to the support for severing slices from the material, and an auxiliary support for the slices being cut from the material adapted to have its supporting surface move in a plane substantially parallel to the supporting surface of the main support and just in advance of the knife edge.

18. In a slicing machine, the combination with a movable slicing knife, of a support for the work to be sliced, an auxiliary support for the slices as they are cut by the knife during its movement past the support, adapted to be always maintained in a position adjacent the knife edge and in its path of movement, and means for maintaining said support in such a position at all times comprising a pivoted lever operatively connected thereto and to the moving knife.

In testimony whereof, we have signed our names to this specification.

Signed by C. F. M. van Berkel, this eleventh day of October, 1927.

CORNELIS FRANCISCUS MARIA van BERKEL.

Signed by Jetze van Hoorn, this eleventh day of October, 1927.

JETZE van HOORN.